Oct. 13, 1970  E. K. HANSEN  3,533,302
APPARATUS FOR LOCKING A TILTABLE STEERING
COLUMN IN AN ADJUSTED POSITION
Filed March 17, 1969  2 Sheets-Sheet 2

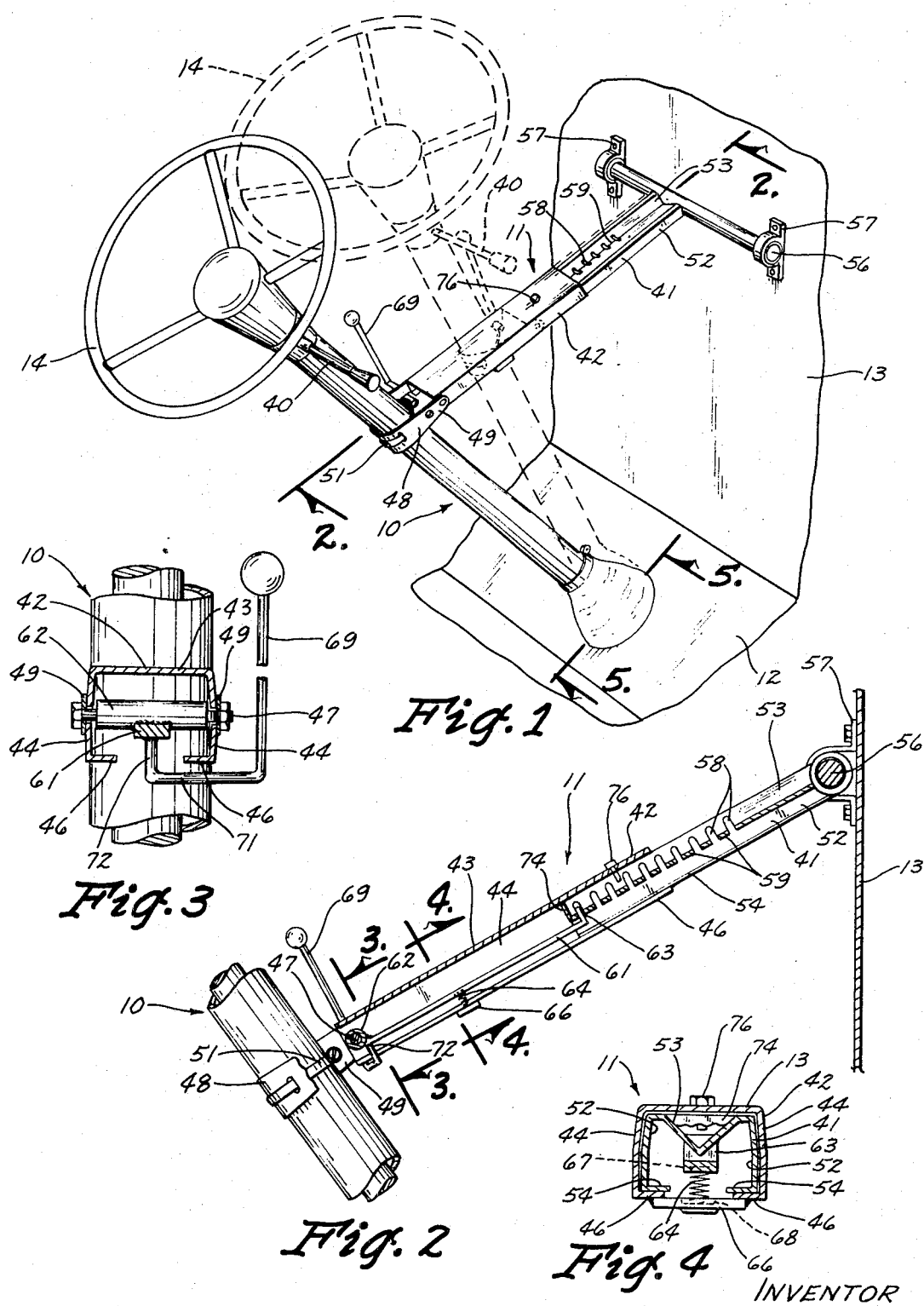

INVENTOR
ELMER K. HANSEN
BY
ATTORNEY

United States Patent Office 3,533,302
Patented Oct. 13, 1970

3,533,302
APPARATUS FOR LOCKING A TILTABLE STEERING COLUMN IN AN ADJUSTED POSITION
Elmer K. Hansen, 801 S. Martha,
Sioux City, Iowa 51102
Filed Mar. 17, 1969, Ser. No. 807,557
Int. Cl. B62d 1/18
U.S. Cl. 74—493
6 Claims

ABSTRACT OF THE DISCLOSURE

The steering column of the vehicle is tiltable about an axis adjacent its lower end and disposed transversely of the vehicle to provide for a tilting movement through a relatively large angular range. The locking apparatus is located adjacent the upper end of the steering column and includes a pair of elongated hollow members arranged in a telescoping assembly for extension and retraction of one member relative to the other member. The telescoping assembly is pivotally interconnected to the steering column and to a fixed portion of the vehicle. Coacting locking means on and within the telescoping members are actuated into and out of releasable locking engagement to lock the members against telescoping action at an adjusted tilted position of the steering column.

SUMMARY OF THE INVENTION

The invention provides a locking apparatus for a tiltable column that is of a compact construction and efficient in operation to rigidly lock the column in an adjusted tilted position over a wide range of tilting movement. The telescoping members completely enclose or house the locking mechanism, so that only the handle for manually actuating the mechanism is exposed to view. With the handle located adjacent to the steering wheel it is conveniently operated with one hand while leaving the other hand free to grip the steering wheel to tilt the column to a desired adjusted position. When the adjusted position is reached the column is positively locked in such position by merely releasing the handle.

BRIEF DESCRIPTION OF DRAWINGS

FIG. 1 is a perspective view showing the tiltable steering column in assembly relation with the adjustable locking apparatus therefor;

FIG. 2 is an enlarged sectional detail view taken along the line 2—2 in FIG. 1;

FIGS. 3 and 4 are enlarged sectional views as seen along the lines 3—3 and 4—4, respectively, in FIG. 2;

DETAILED DESCRIPTION OF THE PREFERRED EMBODIMENT

Figure 6:
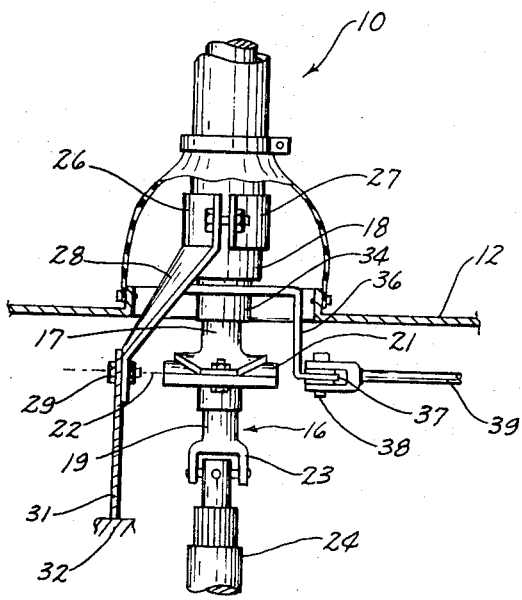
FIG. 6 is a sectional view taken along line 6—6 in FIG. 5.

With reference to FIG. 1, there is illustrated a tiltable steering column 10 and a locking apparatus 11 therefor shown in assembly relation relative to a conventional floor board 12 and fire wall 13 of a self-propelled vehicle (not shown). The steering column is provided with the usual steering wheel 14 secured in a conventional manner to the upper end of a steering shaft 16 (FIG. 6) that has a top section 17 rotatably mounted in the outer tubular housing 18 of the column 10. A bottom shaft section 19 projects downwardly from the housing 18. The adjacent ends of the shaft sections 17 and 19 are connected together by a flexible coupling 21 to provide for a tilting movement of the top section 17 relative to the bottom section 19 about an axis, indicated at 22. The lower end of the bottom shaft section 19 is secured through a universal joint 23 with one end of a splined telescopic shaft 24, the opposite end of which is connected to a suitable linkage system (not shown) for turning the front ground wheels of the vehicle.

Figure 5:
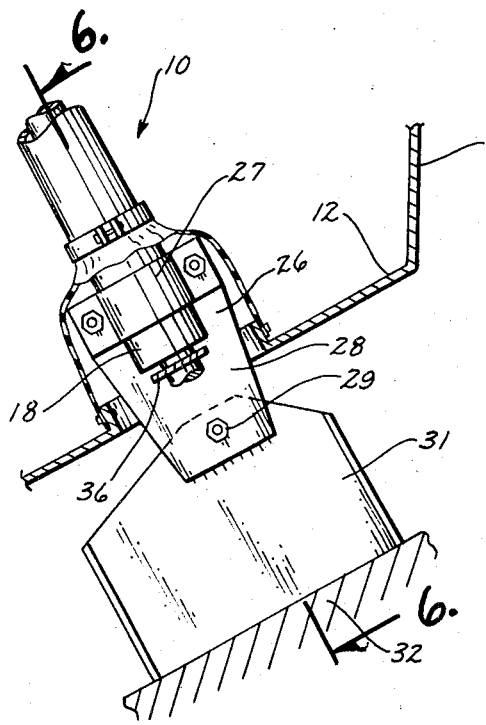
FIG. 5 is an enlarged sectional detail view on line 5—5 of FIG. 1.

A supporting bracket 26 (FIGS. 5 and 6) is secured about the lower end of the steering column housing 18 by a clamp 27 and has a plate or arm section 28 that is inclined downwardly and outwardly from the housing 18. The free end of the arm section 28 is pivotally connected at 29 to an upright mounting plate 31 that is rigidly secured to a fixed portion 32 of the vehicle frame. The axis of the pivot connection 29 extends transversely of the vehicle in coaxial alignment with the axis 22 of the flexible coupling 21.

Additionally, it will be seen that a rotatable shift tube 34 (FIG. 6) within the column housing 18 has an angulate rock arm 36 with a linear terminal section 37 located opposite the flexible coupling 21 and projected therefrom in a radial direction relative to the shift tube 34. This terminal section 37 is in a pivot connection 38 with a linkage 39 that is operatively associated with the power transmission system (not shown) of the vehicle. The axis of the pivoted connection 38 extends normal to the axis 22, and the longitudinal axis of the terminal section 37 is in linear alignment with the axis 22. The upper end of the shift tube 34 carries the usual shift lever 40 (FIG. 1).

It is thus seen that the axes of the flexible coupling and pivot 29, respectively, and the longitudinal axis of the rock arm terminal section 37 all lie in a common axis 22 extended transversely of the vehicle with the column 10 being tiltable relative to such common axis. The tilting movement of the column 10 can take place over a relatively wide range of adjusted positions with a minimum resultant movement in the linkage systems for the steering and shifting mechanisms. Since the steering column 10 is thus tiltable substantially independently of any resultant movement of the steering and shifting linkage systems it is readily and easily movable to an adjusted position with a minimum of manual effort.

The steering column 10 is rigidly locked in an adjusted tilted position by the locking apparatus 11 which includes a telescopic assembly comprised of an inner member 41 and an outer member 42 that is extensible and retractable relative to the inner member 41. The outer member 42 (FIGS. 2 and 4) is of a channel shape having a web section 43 and leg sections 44 that terminate in inwardly extended projections or shoulders 46. The rear end of the outer member 42 is pivotally supported on a bolt 47 (FIGS. 2 and 3) that extend transversely through the leg sections 44. A U-shaped bracket 48 on the housing 18 of the steering column 10 has forwardly extended arms 49 arranged in a straddling relation with the rear end of the outer member 42 and is clamped in a fixed position on the housing 18 by a ring clamp 51. The bolt 47 projects through and is carried on the arms 49 to provide for the up and down pivotal movement of the outer member 42 relative to the steering column 10.

The inner member 41 (FIG. 4) is of a generally M-shape in transverse section so as to have leg sections 52 interconnected at their upper ends by a web section 53 of a V-shape. The lower ends of the leg sections 52 terminate in inwardly projected shoulders 54. With the inner member 41 telescopically received within the outer member 42 the shoulders 46 and 54 on the leg sections 44 and 52, respectively, are in a side by side sliding engagement.

Secured to the front end of the inner member 41 (FIGS. 1 and 2) is a transverse shaft 56, the ends of which are rotatably supported in bearing members 57 that are secured to the fire wall 13. The inner member 41 is thus pivotally supported for up and down movement relative to the fire wall 13. As thus far described, it is seen that when the steering column 10 is tilted about the axis 22 of the pivot 29 that the outer member 42 is extended and retracted relative to the rear end of the inner member 41, concurrently with a relative pivotal movement of the members 41 and 42 about their respective pivot supports 47 and 56.

To lock the members 41 and 42 against longitudinal movement in an adjusted tilted position for the column 10, the apex of the V-web section 53 of the inner member 41 (FIGS. 1 and 2) has a series of longitudinally spaced notches 58 which form longitudinally spaced teeth members 59 that extend transversely of the inner member 41. The teeth members 59 are selectively engageable by an elongated latch bar 61 that is located within and extends longitudinally of the outer telescoping member 42 at a position below the apex of the V-web section 53 of the inner member 41. The rear end of the latch bar 61 is secured to a sleeve bearing 62 (FIG. 3) that is rotatably mounted about the pivot bolt 47 between the leg sections 44 of the outer telescoping member 42.

The forward end of the latch bar 61 is upturned to form an abutment or tooth member 63 (FIGS. 2 and 4). On upward pivotal movement of the latch bar 61 the abutment member 63 is movable within a slot or notch 58 for abutting engagement with a pair of adjacent side teeth members 59. The abutment member 63 is constantly urged into engagement with the teeth members 59 by a coil spring 64 that is arranged in compression between the under side of the latch bar 61 and a holding plate 66 extended between and secured to the undersides of the shoulders 46 of the outer member 42. The opposite ends of the spring 64 are positioned within seats 67 and 68 formed in the latch bar 61 and holding plate 66, respectively.

To pivotally move the abutment member 63 out of engagement with the teeth members 59 there is provided an upright handle 69 (FIGS. 2 and 3) located adjacent one end of the pivot bolt 47. The handle 69 is integrally formed at its lower end with a lateral arm 71 which projects below the outer member 42 and terminates in an upright section 72 that extends between the shoulders 46 for securement to the mounting sleeve 62. On a forward movement of the handle 69 the latch bar 61 is pivoted downwardly against the action of the spring 64 to move the abutment 63 clear of the teeth members 59. With the handle manually depressed with one hand the steering wheel 14 is gripped in the other hand to tilt the steering column 10 to an adjusted position. On release of the handle 69 the abutment member 63 is urged by the spring 64 into a slot 58 for abutting engagement with corresponding adjacent side teeth members 59. With the outer member 42 thus locked against longitudinal movement relative to the inner member 41 the column 10 is rigidly connected to the fire wall 13.

To maintain the members 41 and 42 against separation from a telescopic relation when the latch bar 61 is held out of engagement with the teeth member 59, the V-section 53 at the rear end of the inner member 41 is closed by a stop member 74 (FIGS. 2 and 4). The outer member 42 adjacent its front end has a stop screw 76 threadable downwardly through the web section 43 so as to extend within the trough formed by the V-web section 53 of the inner member 41. Extension of the outer member 42 relative to the inner member 41 thus takes place to a stop position defined by the abutting engagement of the stop screw 76 with the stop plate 74.

In a preferred embodiment of the invention the members 41 and 42 are each about ten inches in length and relatively assembled to provide for the outer member 42 being extended about six inches relative to the inner member 41. The members 41 and 42 constitute a housing for the latching mechanism so that only the handle 69 projects therefrom. With the handle located adjacent to the steering column 10 and extended upwardly toward the steering wheel 14 at a position forwardly of the steering column the locking apparatus 11 is compact and neat in appearance along with providing for a free and unobstructed movement of the vehicle operator in his operation of the vehicle.

What is claimed is:
1. In a self-propelled vehicle having a steering column mounted for up and down tilting movement about an axis disposed transversely of the vehicle at a position adjacent the lower end of the column, adjustable apparatus for locking said column in an adjusted position comprising:
  (a) a pair of hollow elongated members having inner end sections in a telescoping relation for the longitudinal extension of a first one of said elongated members relative to the second one of said elongated members,
  (b) a pivot means on said column for pivotally supporting the outer end of said first elongated member,
  (c) means pivotally supporting the outer end of said second elongated member on a fixed portion of said vehicle, said pivot means and pivotal supporting means having the axes thereof parallel to said transverse axis,
  (d) teeth members located within and spaced longitudinally of said second elongated member,
  (e) a pivoted elongated latch member located within and extended longitudinally of said first elongated member having an abutment member at one end movable into releasable engagement with certain of said teeth members,
  (f) means mounting the opposite end of said latch member on said first pivot means,
  (g) means within said first elongated member for constantly urging said abutment member into engagement with said teeth members, and
  (h) a manually operated handle secured to said mounting means for pivotally moving said latch member into and out of engagement with said teeth members,
  (i) said first elongated member, when the latch member is disengaged from said teeth members, being movable relative to said second elongated member in response to a tilting movement of said column to an adjusted position.

2. The invention according to claim 1 including:
  (a) coacting stop means on said pair of elongated memberts to limit the extension of said first elongated member relative to said second elongated member.

3. The invention according to claim 1 wherein:
  (a) said constantly urging means comprises a coil spring arranged in compression between said latch member and an inner surface portion of said first elongated member.

4. The invention according to claim 1 wherein:
  (a) the steering column includes a first steering shaft section rotatably mounted therein,
  (b) a second steering shaft section connectible with the steering mechanism of the vehicle, and
  (c) a yieldable coupling for connecting together adjacent ends of said first and second steering shaft sections,
  (d) said yieldable coupling providing for a relative longitudinal inclination of said shaft sections about an axis coaxial with said transverse axis.

5. In a self-propelled vehicle having a steering column mounted for up and down tilting movement about an axis disposed transversely of the vehicle, at a position adjacent the lower end of the column, adjustable apparatus for locking said column in an adjusted tilted position, comprising:
  (a) a first elongated member including a pair of transversely spaced upright legs interconnected at the upper ends thereof and having inwardly extended shoulder portions at the lower ends thereof, (b) a second elongated member having a pair of transversely spaced upright leg sections interconnected at the upper ends thereof by a web section having a series of longitudinally spaced transversely extended teeth members projected downwardly between said leg sections, said second elongated member being telescopically received within one end of said first elongated member, (c) a first pivot means pivotally supporting the opposite end of said first elongated member on said column, (d) second means pivotally supporting the free end of said second elongated member on a fixed portion of said vehicle at a position forwardly of said column, said two pivot means having the axes thereof parallel to said transverse axis, (e) a pivoted elongated latch member located within and extended longitudinally of said first member at a position below said teeth members for pivotal movement into engagement with certain of said teeth members, (f) means for mounting said latch member on said first pivot means, (g) spring means within said first elongated member for constantly urging said latch member into engagement with said teeth members, and (h) a manually operated handle secured to said mounting means for pivotally moving said latch member out of engagement with said teeth members, (i) said two elongated members, when the latch member is disengaged from said teeth member, being relatively movable in response to a tilting movement of said column to an adjusted position.

6. In a self-propelled vehicle having a steering column mounted for up and down tilting movement about an axis disposed transversely of said vehicle at a position adjacent the lower end of the column, adjustable apparatus for locking said column in an adjusted tilted position including:

(a) a first elongated member of a generally inverted channel shape having leg sections, (b) a second elongated member of a substantially M-shape having leg sections interconnected by a V-shape section, said second member telescopically received within one end of said second member, said V-section having a series of longitudinally spaced transversely extended teeth members in the apex portion thereof, (c) first pivot means supporting the other end of said first member on said column adjacent the upper end thereof, (d) second pivot means supporting the free end of said second member on a fixed portion of said vehicle located forwardly of said column, said two pivot means having the axes thereof parallel to said transverse axis, (e) an elongated latch member located within and extended longitudinally of said first member at a position below said apex portion having an upstanding lateral projection at one end selectively engageable with certain of said teeth members to lock said two elongated members against relative longitudinal movement, (f) means for mounting the other end of said latch member on said first pivot means for pivotal movement of said projection into and out of engagement with said teeth members, (g) spring means interconnected between said latch member and the leg sections of said outer member for constantly urging said projection into engagement with said teeth members, and (h) a manually operated handle secured to said mounting means for pivotally moving said latch member, (i) said two elongated members, on disengagement of the latch member from said teeth members, being relatively movable in response to a tilting movement of said column to an adjusted position.

References Cited

UNITED STATES PATENTS

| | | | |
|---|---|---|---|
| 1,368,959 | 2/1921 | Moller | 74—493 |
| 2,903,904 | 9/1959 | Mackie | 74—493 |

MILTON KAUFMAN, Primary Examiner

U.S. Cl. X.R.

180—78; 280—87